US006340726B1

(12) United States Patent
Murray et al.

(10) Patent No.: US 6,340,726 B1
(45) Date of Patent: Jan. 22, 2002

(54) SILICONE POLYMER DIOL COMPOSITIONS AND CONDENSATION POLYMER/SILICONE POLYMER BLENDS

(75) Inventors: David Logan Murray, Fall Branch; Allan Scott Jones, Limestone; Wesley R. Hale, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/518,071

(22) Filed: Mar. 2, 2000

Related U.S. Application Data

(60) Provisional application No. 60/122,625, filed on Mar. 3, 1999.

(51) Int. Cl.$^7$ .............................. C08K 5/5419
(52) U.S. Cl. ................. 524/731; 524/839; 524/845
(58) Field of Search ................. 524/731, 839, 524/845

(56) References Cited

U.S. PATENT DOCUMENTS

| | | |
|---|---|---|
| 2,891,920 A | 6/1959 | Hyde et al. |
| 3,294,725 A | 12/1966 | Findley et al. |
| 3,384,653 A | 5/1968 | Erner et al. |
| 3,394,164 A | 7/1968 | McClellan et al. |
| 3,642,964 A | 2/1972 | Rausch, Jr. et al. |
| 3,644,457 A | 2/1972 | König et al. |
| 3,779,969 A | 12/1973 | Slagel et al. |
| 3,883,571 A | 5/1975 | Allport et al. |
| 3,985,703 A | 10/1976 | Ferry et al. |
| 4,031,026 A | 6/1977 | Ibbotson |
| 4,115,429 A | 9/1978 | Reiff et al. |
| 4,118,411 A | 10/1978 | Reiff et al. |
| 4,163,002 A | 7/1979 | Pohl et al. |
| 4,177,177 A | 12/1979 | Vanderhoff et al. |
| 4,180,494 A | 12/1979 | Fromuth et al. |
| 4,202,957 A | 5/1980 | Bonk et al. |
| 4,204,049 A | 5/1980 | Matthies et al. |
| 4,259,478 A | 3/1981 | Jackson, Jr. et al. ........ 528/367 |
| 4,366,306 A | 12/1982 | Smith |
| 4,370,160 A | 1/1983 | Ziemelis |
| 4,376,834 A | 3/1983 | Goldwasser et al. |
| 4,393,153 A | 7/1983 | Hepp |
| 4,414,362 A | 11/1983 | Lenke et al. |
| 4,458,050 A | 7/1984 | Heyman |
| 4,474,918 A | 10/1984 | Seymour et al. |
| 4,495,324 A | 1/1985 | Chacko et al. |
| 4,498,929 A * | 2/1985 | Robertson .................. 106/38.2 |
| 4,567,236 A | 1/1986 | Goldwasser et al. |
| 4,568,616 A | 2/1986 | Seifried et al. |

(List continued on next page.)

FOREIGN PATENT DOCUMENTS

| | | |
|---|---|---|
| CA | 2019716 | 1/1991 |
| EP | 0232694 | 8/1987 |
| EP | 0232695 | 8/1987 |
| EP | 0255137 | 2/1988 |
| EP | 317057 | 5/1989 |
| EP | 0365234 | 4/1990 |
| EP | 377447 | 7/1990 |
| EP | 0377533 | 7/1990 |
| EP | 0407834 | 1/1991 |
| EP | 0407834 A2 | 1/1991 |
| EP | 0440970 | 8/1991 |
| EP | 0517171 | 12/1992 |
| EP | 0581224 | 2/1994 |
| EP | 0752448 | 1/1997 |
| JP | 54157157 | 12/1979 |
| JP | 60040182 | 3/1985 |
| JP | 63186703 | 8/1988 |
| JP | 64001786 | 1/1989 |
| JP | 1123854 | 5/1989 |
| JP | 1163254 | 6/1989 |
| JP | 2016145 | 1/1990 |
| JP | 2024346 | 1/1990 |
| JP | 2155944 | 6/1990 |
| JP | 4175370 | 6/1992 |
| JP | 04335002 | 11/1992 |
| JP | 06184217 | 7/1994 |
| KR | 9503803 | 4/1995 |
| WO | WO 89/03860 | 5/1989 |
| WO | WO 94/01482 | 1/1994 |
| WO | WO 95/22570 | 8/1995 |
| WO | WO 96/30428 | 10/1996 |
| WO | WO 98/02479 | 1/1998 |

OTHER PUBLICATIONS

Majumdar et al., "Effect of Extruder Type on the Properties and Morphology of Reactive Blends Based on Polyuamides," *Journal of Applied Polymer Science*, 54, 339–354 (1994).

Flexman, E.A., "Toughened Semicrystalline Engineering Polymers; Morphology, Impact Resistance and Fracture Mechanisms," *Toughened Plastics I*, 79–104 (1993).

Hobbs et al., "Toughened Nylon Resins," *Polymer Engineering and Science*, vol. 23, 7, 380–389 (1993).

*Primary Examiner*—Margaret G. Moore
(74) *Attorney, Agent, or Firm*—Bernard J. Graves, Jr., Esq.

(57) ABSTRACT

The invention herein provides a silicone polymer emulsion comprising: a) a silicone polymer; and b) a surfactant; and a liquid continuous phase comprising a diol, wherein the diol comprises from about 25 to about 100% by weight of the continuous phase. Further provided is a method of making a condensation polymer/silicone polymer blend comprising the steps of: a) preparing a silicone/polymer emulsion comprising a silicone polymer in a liquid continuous phase; b) introducing the silicone polymer emulsion into a condensation polymerization reaction medium prior to or during the condensation polymerization reaction, wherein the condensation polymerization reaction medium comprises (1) a diacid, di-isocyanate, dialkyl carbonate, diaryl carbonate, dihalo carbonate or a mixture thereof, wherein the continuous phase, the condensation polymerization reaction medium or both comprises a diol component; and c) polymerizing the diol and component b(1) thereby forming a condensation polymer/silicone polymer blend. Polymer blends comprising a condensation polymer/silicone polymer blend are also provided.

10 Claims, No Drawings

U.S. PATENT DOCUMENTS

| | | | |
|---|---|---|---|
| 4,578,437 A | 3/1986 | Light et al. | |
| 4,618,642 A | 10/1986 | Schoenherr | |
| 4,675,372 A | 6/1987 | Policastro | |
| 4,708,986 A | 11/1987 | Gerth et al. | |
| 4,788,001 A | 11/1988 | Narula | |
| 4,810,763 A | 3/1989 | Mallya et al. | |
| 4,885,350 A | 12/1989 | Yamashita et al. | |
| 4,904,733 A | 2/1990 | Gerth et al. | |
| 4,954,565 A | 9/1990 | Liles | |
| 4,965,312 A * | 10/1990 | Nakai et al. | 524/506 |
| 4,977,213 A | 12/1990 | Giroud-Abel et al. | |
| 5,061,766 A | 10/1991 | Yamashita et al. | |
| 5,189,107 A | 2/1993 | Kasai et al. | |
| 5,250,621 A | 10/1993 | Lütjens et al. | |
| 5,270,380 A | 12/1993 | Adamson et al. | |
| 5,300,555 A | 4/1994 | Weih et al. | |
| 5,344,675 A | 9/1994 | Snyder | |
| 5,349,029 A | 9/1994 | Nam | |
| 5,358,981 A | 10/1994 | Southwick | |
| 5,409,967 A | 4/1995 | Carson et al. | |
| 5,559,159 A | 9/1996 | Sublett et al. | 521/48.5 |
| 5,594,059 A | 1/1997 | Mason et al. | |
| 5,612,407 A | 3/1997 | Southwick | |
| 5,652,306 A | 7/1997 | Meyer et al. | |
| 5,674,937 A | 10/1997 | Berg et al. | |
| 5,677,366 A | 10/1997 | Wu | |
| 5,891,950 A | 4/1999 | Collins et al. | |
| 6,022,925 A * | 2/2000 | Tomko et al. | 524/547 |

* cited by examiner

SILICONE POLYMER DIOL COMPOSITIONS AND CONDENSATION POLYMER/SILICONE POLYMER BLENDS

CROSS REFERENCE TO RELATED APPLICATIONS

This application claims priority to U.S. Provisional Application Serial No. 60/122,625, filed Mar. 3, 1999, the disclosure of which is incorporated herein in its entirety.

FIELD OF THE INVENTION

This application relates to silicone polymer diol emulsions. This application further relates to silicone blend condensation polymers and methods of making the same. Such condensation polymers may be prepared by introducing a silicone polymer emulsion into a condensation polymerization reaction to provide a condensation polymer/silicone polymer blend. The silicone polymer emulsions utilized in the preparation of the condensation polymers may comprise water, diol and, optionally cosolvents.

BACKGROUND

It is known to modify condensation polymers by blending the condensation polymer with another polymer in an extruder. For example, to improve the impact properties of a polyester, a low Tg elastomer is typically added to the polyester in a twin-screw extruder. Japan Kokai JP 02155944 describes compounds for molded articles comprising physical blends of saturated polyester with polystyrene polymers containing 1–100 phr glycidylamido-grafted olefin polymers of glycidyl methacrylate-graft olefin polymers. The size of the dispersed phase is critical in obtaining good properties. However, such extrusion processes are energy intensive, and often result in the reduction in the physical properties of the polymer, in particular the molecular weight, and require a blending step, which utilizes more resources and more time.

Typically, low Tg elastomers are used to impact modify the polyester. These low Tg elastomers are difficult to handle and often require that a second monomer, such as poly (methyl methacrylate) to be utilized as a "shell" surrounding the low Tg polymer "core" so that the low Tg polymer may be handled. The core-shell polymer is isolated, dried and then added to the polyester in an extruder. U.S. Pat. Nos. 5,652,306, 4,180,494 and 5,409,967 disclose compositions for impact modification of aromatic polyesters that involve blending an acrylic or polybutadiene/acrylic rubber powder with polyethylene terephthalate (PET). The acrylic rubber particles are prepared by typical core/shell emulsion polymerization and then harvested by spray drying the emulsion. The harvested rubber is then melt blended in an extruder to produce the impact modified PET.

Silicone rubber has also been utilized as a low Tg polymer for modifying polyesters. U.S. Pat. No. 5,594,059 discusses the melt mixing of silicone rubber powder into polyester and polycarbonate blends. These compositions are a physical blend of silicone rubber and polyester/polycarbonates. As noted, such melt mixing techniques are expensive and time consuming, thus, it would be beneficial to be able to combine silicone polymers with materials such as polyesters without the need for such mixing.

There exists a need for a process for producing a polymer blend by more economical methods. Such a need has been solved by the present invention, which can achieve such a blend in a polymerization reactor, wherein the physical properties of the condensation polymer are maintained or improved.

SUMMARY OF THE INVENTION

In one aspect, the invention provides a silicone polymer emulsion comprising:
a. a silicone polymer;
b. a surfactant; and
c. a liquid continuous phase comprising a diol, wherein the diol comprises from about 25 to about 100% by weight of the continuous phase.

In a further aspect, the invention provides a method of making a condensation polymer/silicone polymer blend comprising the steps of:
a. preparing a silicone polymer emulsion comprising a silicone polymer in a liquid continuous phase;
b. introducing the silicone polymer emulsion into a condensation polymerization reaction medium prior to or during the condensation polymerization reaction, wherein the condensation polymerization reaction medium comprises (1) a diacid, di-isocyanate; dialkyl carbonate, diaryl carbonate, dihalo carbonate or a mixture thereof, and wherein the continuous phase, the condensation polymerization reaction medium or both comprises a diol component; and
c. polymerizing the diol and component b(1), thereby forming a condensation polymer/silicone polymer blend.

In yet a further aspect, the invention provides a method of making a condensation polymer/silicone polymer blend comprising the steps of:
a. preparing a polymer colloid system comprising a silicone polymer dispersed in a liquid continuous phase;
b. introducing the polymer colloid system into a glycolysis reaction medium prior to or during the glycolysis reaction wherein the glycolysis reaction medium comprises a polyester, copolyester, polyesteramide, polycarbonate, or a mixture thereof, wherein the liquid continuous phase, the gylcolysis reaction medium, or both comprises a diol component; and
c. polymerizing the fully or partially glycolyzed polyester, copolyester, polyesteramide, polycarbonate or mixture thereof, thereby providing a condensation polymer/silicone polymer blend.

In yet a further embodiment, the invention provides a method of making a condensation polymer/silicone polymer blends comprising the steps of:
a. preparing a polymer colloid system comprising a silicone polymer and a liquid continuous phase;
b. introducing the polymer colloid system into a condensation polymer; and
c. extruding the polymer colloid system and the condensation polymer, thereby providing a condensation polymer/silicone polymer blend.

Additional advantages of the invention will be set forth in part in the description which follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, and, as such, may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms a, an and the include plural referents unless the context clearly dictates otherwise.

Optional or optionally means that the subsequently described event or circumstances may or may not occur, and that the description included instances where said event or circumstance occurs and instances where it does not.

Silicone polymer emulsion is herein defined as a dispersion of polymeric particles in a continuous phase, the polymeric particles preferably having a size range of from about 0.1 to about 10 microns. The silicone polymers of the present invention preferably have a molecular weight of from about 5,000 to about 1,000,000 Daltons. The polymeric particles are preferably produced through emulsion polymerization processes. Alternatively, such emulsions may be prepared through direct emulsification e.g., mechanical emulsification processes.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

Diol is a synonym for glycol or dihydric alcohol. Polyol is a polyhydric alcohol containing three or more hydroxyl groups.

The abbreviation "nm" means nanometers. "Tg" means glass transition temperature.

As used herein, the term "condensation polymerization" is used to refer to condensation polymerization reactions and "condensation polymer" is the product thereof. The term "condensation polymerization" as used herein is also used to refer more generally to polymerization reactions of the step-growth-type. As used herein, the term "condensation polymer" is synonymous with "step-growth polymer."

Throughout this application, where publications are referenced, the disclosures of these publications in their entireties are hereby incorporated by reference into this application in order to more fully describe the state of the art to which this invention pertains.

In one aspect, the invention provides a silicone polymer emulsion comprising:
 a. a silicone polymer;
 b. a surfactant; and
 d. a liquid continuous phase comprising a diol, wherein the diol comprises from about 25 to about 100% by weight of the continuous phase.

In a further aspect, the invention provides a method of making a condensation polymer/silicone polymer blend comprising the steps of:
 a. preparing a silicone polymer emulsion comprising a silicone polymer in a liquid continuous phase;
 b. introducing the silicone polymer emulsion into a condensation polymerization reaction medium prior to or during the condensation polymerization reaction;
 wherein the condensation polymerization reaction medium comprises (1) a diacid, di-isocyanate; dialkyl carbonate, diaryl carbonate, dihalo carbonate or a mixture thereof,
 and wherein the continuous phase, the condensation polymerization reaction medium or both comprises a diol component; and
 c. polymerizing the diol and component b(1) thereby forming a condensation polymer/silicone polymer blend.

In yet a further aspect, the invention provides a method of making a condensation polymer/silicone polymer blend comprising the steps of:
 a. preparing a polymer colloid system comprising a silicone polymer dispersed in a liquid continuous phase;
 b. introducing the polymer colloid system into a glycolysis reaction medium prior to or during the glycolysis reaction wherein the glycolysis reaction medium comprises a polyester, copolyester, polyesteramide, polycarbonate or a mixture thereof;
 wherein the liquid continuous phase, the gylcolysis reaction medium, or both comprises a diol component; and
 c. polymerizing the fully or partially glycolyzed polyester, copolyester, polyesteramide, polycarbonate or mixture thereof, thereby providing a condensation polymer/silicone polymer blend.

In yet a further embodiment, the invention provides a method of making a condensation polymer/silicone polymer blends comprising the steps of:
 a. preparing a polymer colloid system comprising a silicone polymer and a liquid continuous phase;
 b. introducing the polymer colloid system into a condensation polymer; and
 c. extruding the polymer colloid system and the condensation polymer, thereby providing a condensation polymer/silicone polymer blend.

Still further, the invention provides products made by the processes herein.

I. Silicone Polymer Emulsion

In one embodiment, the aqueous silicone polymer emulsions of the present invention comprise a plurality of silicone polymer particles. The silicone polymers of the present invention may preferably have functional groups. Such functional groups may comprise amino, epoxy, vinyl, mercapto, carbonate, isocyanate or silicone hydride. In a particularly preferred embodiment, the silicone polymer is silanol terminated polydiorganosiloxane ("PDOS"). Other preferred silicone polymers include alkylmethylsiloxanes or aminopropylsiloxanes.

The silicone polymer emulsion preferably contains at least one surfactant that stabilizes the dispersed silicone polymer particles in the emulsion. The emulsion should preferably have an average particle size from about 0.1 to about 10 microns. Such emulsions may be prepared, for example, by methods wherein a cyclic or linear oligomeric silicone polymer, such as PDOS, is dispersed in an aqueous continuous phase with the aid of the above mentioned surfactant and are thereafter emulsion polymerized by the introduction of an acid or base catalyst. These emulsions can be illustrated by the disclosures of, among others, U.S. Pat. Nos. 4,954,565, 4,618,642, 3,294,725, and 2,891,920, each of which are hereby incorporated herein in their entireties by this reference.

In a preferred embodiment, the silicone polymer emulsions are prepared by a direct emulsification process. In this process, a mixture of water, and/or diol silicone polymer and one or more surfactants are processed under high shear conditions using either conventional mixing equipment or high shear devices such as a Microfuidizer™. Methods for preparing these polymer emulsions are given in U.S. Pat. Nos. 4,177,177 and 4,788,001, each of which are herein incorporated in their entireties by this reference. When water is present in the silicone polymer emulsions, water is present from about 10 to about 70% by weight, and, more preferably, about 10 to about 50% by weight.

In still a further embodiment, the continuous phase comprises a water component, wherein the water component is present in an amount of from about 1 to about 25% by weight, based upon the total weight of the continuous phase, and further preferably, about 1 to about 50% by weight, based upon the total weight of the continuous phase, and still preferably, from about 1 to about 75% by weight, based upon the total weight of the continuous phase.

In a further, still preferred embodiment, the silicone polymer emulsions of this present invention comprise a diol. Diol components useful for the continuous phase of the diol silicone polymer emulsion compositions include, but are not limited to, any aliphatic or cycloaliphatic diol having from about 2 to about 10 carbon atoms, or a mixture thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans- 2,2,4,4-tetramethyl-1,3-cyclobutanediol, diethylene diol, 2,2,4-trimethyl-1,3-pentanediol, 2-methyl-1,3-propanediol, 2-methyl-1,3-pentanediol, or a mixture thereof; more preferred diols include ethylene diol, propylene diol, tripropylene diol, 1,4-butanediol, diethylene diol, neopentyl diol, cis and trans-cyclohexanedimethanol, or a mixture thereof; even more preferred diols include neopentyl diol, ethylene diol, cis or trans cyclohexanedimethanol, 1,4 butanediol, or a mixture thereof.

In one embodiment, the diol component is present in an amount of from about 25 to about 100% by weight, based on the total weight of the continuous phase, preferably from about 30 to about 100% by weight, based on the total weight of the continuous phase, more preferably, from about 40 to about 100% by weight, based on the total weight of the continuous phase, more preferably, from about 50 to about 100% by weight, based on the total weight of the continuous phase, and, even more preferably, about 60 to about 100% by weight, based on the total weight of this continuous phase. In a further embodiment, the diol comprises from about 70 to about 100% by weight of the continuous phase, in a further embodiment, about 80 to about 100% by weight of the continuous phase, and in still a further embodiment, about 90 to about 100% by weight of the continuous phase. In a further embodiment, the diol containing phase consists essentially of the diol component. In a further embodiment, the diol is present from about 1 to about 25 percent by weight of the continuous phase. In yet a further embodiment, the diol is present from about 1 to about 10% by weight of the continuous phase.

The total weight of the continuous phase includes the weight of the diol component, water component, polyol component and any co-solvent. As noted, the weight of any surfactant is not included in the total weight of the continuous phase. In a preferred embodiment, the diol component consists essentially of tripropylene glycol, 1,4-butanediol, neopentyl glycol, cyclohexanedimethanol, or a mixture thereof.

In a preferred embodiment, a surfactant is present in the silicone polymer emulsions. A surfactant is preferably used to prepare the silicone polymer emulsions. One of skill in the art would recognize that the type and amount of surfactant used in the emulsion polymerization depends on the monomer combinations and the polymerization conditions. Surfactants used in the emulsion polymerization may be anionic, cationic, or nonionic. Anionic surfactants that may be used in the invention include surfactants such as alkali metal or ammonium salts of alkyl, aryl or alkylaryl sulfonates, sulfates, phosphates, or a mixture thereof. Further, suitable nonionic surfactants include, but are not limited to, alkyl and alkylaryl polydiol ethers, such as ethoxylation products of lauryl, oleyl and stearyl alcohols; alkyl phenol glycol ethers, including but not limited to, ethoxylation products of octyl or nonylphenol. Suitable surfactants may be found in McCutcheon 's Volume I: *Emulsifiers and Detergents* 1996 *North American Edition*, MC Publishing Co., Glen Rock, N.J., 1996.

In addition to the diol component and/or water component, the continuous phase may contain one or more polyol components. Representative polyol components that may be used in the continuous phase include, but are not limited to, glycerol, trimethylolpropane, pentaerythritol, 1,2,6-hexanetriol, sorbitol, 1,1,4,4-tetrakis(hydroxymethyl) cyclohexane, tris-(2,hydroxyethyl)isocyanurate, dipentaerythritol or a mixture thereof. In addition to low molecular weight polyols, higher molecular weight polyols (MW about 400 to about 3000), preferably triols derived by condensing alkylene oxides having from about 2 to about 3 carbons, e.g., ethylene oxide or propylene oxide, with polyol initiators, having from about 3 to about 6 carbons, e.g., glycerol, can also be used.

The continuous phase may also comprise a cosolvent. These cosolvents include, but are not limited to, water, methanol, ethanol, propanol, n-butanol, or a mixture thereof. The cosolvent may be present in the amount of less than about 60% by weight, more preferably less than about 40% by weight, based on the total weight of the continuous phase.

Preferably, the silicone polymers utilized to form the emulsions of the present invention may be crosslinked prior to addition of the emulsion to a condensation polymerization reaction. Many methods are present in the literature to crosslink silicone polymer emulsions. For example, U.S. Pat. No. 4,370,160 discloses microparticles, such as microspheres and microcapsules, comprising a solid PDOS prepared by irradiation of a dispersion of discrete particles with ultraviolet light. The discrete particles are dispersed in a U.V. transparent fluid continuous phase and are sphere-like particles of a U.V. curable, liquid PDOS component containing a material to be encapsulated.

In another example, U.S. Pat. No. 4,618,642 discloses how to crosslink aqueous emulsions of silicone particles. The crosslinking is carried out by mixing an anionic emulsion containing dispersed particles of hydroxyl functional PDOS, a dialkyltindicarboxylate and a trifunctional organosilane. U.S. Pat. No. 5,674,937, also discloses methods of curing phase inverted silicone polymer emulsions.

The diol silicone emulsions of the present invention may also be prepared by emulsion polymerization techniques. Such emulsions may be prepared, for example, by methods wherein a cyclic or linear oligomer siloxane polymer, such as PDOS, are dispersed in a glycol continuous phase with the aid of a surfactant and are thereafter emulsion polymerized by the introduction of an acid or base catalyst. Examples of suitable acid and base catalysts can be illustrated by the disclosures of, among others, U.S. Pat. Nos. 4,954,595, 4,618,642, 3,294,725 and 2,891,920.

In a preferred embodiment, the silicone polymer emulsions are prepared by a direct emulsification. In this process, a mixture of diol, silicone polymer and one or more surfactants are processed under high shear conditions using either conventional mixing equipment or high shear device such as a MicroFluidizer™. For example, PDOS can be added to a surfactant and then the diol slowly added with constant shear until the system inverts from a water-in-oil emulsion to an oil-in-water emulsion. The resulting PDOS emulsions can then be crosslinked using common methods known to crosslink the PDOS.

II. Condensation Polymerization

As noted above, the silicone polymer emulsion to be introduced into the condensation polymerization reaction, may be comprised of water, diol, polyol, and mixtures thereof, as well as cosolvents. In a particularly preferred embodiment, the continuous phase may include at least some diol, and may also preferably be comprised primarily of diol, so that the diols in the continuous phase of the silicone polymer emulsion may participate in the condensation polymerization reaction. Further, the continuous phase of each silicone polymer emulsion may consist essentially of or consist of either water, diol, or polyol, or may comprise any proportion of any of these components.

When the polymer colloid system is a silicone polymer emulsion having a diol in the continuous phase, the diols in the continuous phase co-react with the diacids, diisocyanates, dialkyl or diaryl or dihalo carbonates, or mixtures thereof, that comprise the reaction medium which forms the condensation polymer. In one embodiment, the diol component is present in an amount of from about 10 to about 100% by weight of the continuous phase, still further from about 20 to about 100% by weight of the continuous phase. In further embodiments, the diol is present in about 25 to about 100% by weight, based on the total weight of the continuous phase, preferably from about 30 to about 100% by weight, based on the total weight of the continuous phase, more preferably, from about 40 to about 100% by weight, based on the total weight of the continuous phase, more preferably, from about 50 to about 100% by weight, based on the total weight of the continuous phase, and, even more preferably, about 60 to about 100% by weight, based on the total weight of this continuous phase. In a further embodiment, the diol comprises from about 70 to about 100% by weight of the continuous phase, in a further embodiment, about 80 to about 100% by weight of the continuous phase, and in still a further embodiment, about 90 to about 100% by weight of the continuous phase. In a further embodiment, the diol containing phase consists essentially of the diol component. Suitable diol components for the diol based continuous phase of the silicone polymer emulsion include, but are not limited to, the diol components described in Section I.

When the polymer colloid system is a silicone polymer emulsion having a water component, the water may be present in an amount of from about 10 to about 100% by weight of the continuous phase, more preferably from about 20 to about 100% by weight of the continuous phase, still preferably, from about 30 to about 100% by weight of the continuous phase. In a further preferred embodiment, the water may be present at about 40 to about 100% by weight of the continuous phase, more preferably, from about 50 to about 100% by weight of the continuous phase, still preferably from about 60 to about 100% by weight of the continuous phase. In further preferred embodiments, the water may be present at from about 70 to about 100% by weight of the continuous phase, and, further preferably, at from about 80 to about 100% by weight of the continuous phase and, still preferably, from about 90 to about 100% by weight of the continuous phase. In another embodiment, the water may comprise from about 75 to about 100% by weight of the continuous phase. In yet another embodiment, the continuous phase consists essentially of water.

The diol component may be present in either the continuous phase of the silicone polymer emulsion, the condensation polymerization reaction medium, or both. The diol concentration present in the original reaction medium may be adjusted to account for the diol concentration that may be present in the silicone polymer emulsion. The silicone polymer emulsion may be introduced into the condensation polymerization at various stages of the polymerization. For example, in a poly(ethylene terephthalate) (PET) polymerization, dimethyl terephthalate (DMT), ethylene diol (EG) and catalyst metals are placed in a flask and polymerized. The silicone polymer emulsion can be added 1) "up front," i.e., with the other materials at the start; 2) after the other starting materials have melted and formed a homogeneous solution; 3) after the DMT and EG have reacted in the first stage and given off MeOH; 4) right before $N_2$ is turned off and vacuum applied; or 5) sometime during the final "polycondensation phase," or anywhere in between, i.e., during the ester exchange phase or polycondensation phase.

Alternatively, the silicone polymer emulsion may be blended into the fully or partially formed condensation polymer directly in an extruder at temperatures from about 200 to about 320° C. In this process, since the silicone polymer emulsion is added directly to the condensation polymer, there is no need to harvest the silicone polymer from the emulsion. This provides a more economical process over those processes discussed in the prior art.

In one embodiment, the polymer introduced into the condensation polymerization reaction comprises a glycolyzed polyester, copolyester, polyesteramide or polycarbonate.

The final blend can be affected by the time at which the silicone polymer emulsion is added to the condensation polymer. While not wishing to be bound by any mechanism, it is believed that the size and shape of the emulsion polymer in the condensation polymer blend can be affected by the time of the addition. Also, particular chemical interaction between silicone polymer and condensation polymers are affected by time of addition, and, in consequence, will affect the final blend properties.

The amount of latex polymer in the condensation polymer/silicone polymer blend may comprise a wide range of values. However, it is particularly preferred that the amount of silicone polymer in the blend is greater than about 5% by weight of the blend. Still further, it is preferred that the amount of silicone polymer in the condensation polymer/silicone polymer blend be from greater than about 5 to about 50% by weight of the blend, and, still further preferably, from greater than about 5 to about 25% by weight of the blend.

In one aspect, the present invention overcomes the necessity of separating the silicone polymer from the emulsion prior to addition to the condensation polymer. Further, since blending takes place during the condensation polymer formation, there is no need for a polymer/polymer post blending step that is energy intensive, expensive and often leads to the reduction of the molecular weight of the condensation polymer.

In a preferred embodiment, the reaction medium in which the silicone polymer emulsions of the invention are introduced forms polyesters. The term "polyester," as used herein, refers to any unit-type of polyester falling within the scope of the polyester portion of the blend, including, but not limited to, homopolyesters, and copolyesters (two or more types of acid and/or diol residues of monomeric units). The polyesters of the present invention comprise an acid residue and a diol residue. The acid residues of the polyesters of the present invention total about 100 mol % and the diol residues of the polyesters of the present invention total about 100 mol %. It should be understood that use of the corresponding derivatives, specifically acid anhydrides, esters and acid chlorides of these acids is included throughout the application in the term "acid residue." In addition to the acid residue and the diol residue, the polyester may comprise other modifying residues. These modifying residues include, but are not limited to, a diamine, which would result in a polyester/amide.

The polyesters preferably comprise residues of dicarboxylic acids or esters, including, but not limited to, aromatic dicarboxylic acid or ester residues, preferably having from about 8 to about 14 carbon atoms, aliphatic dicarboxylic acid or ester residues, preferably having from about 4 to about 12 carbon atoms, or cycloaliphatic dicarboxylic acid or ester residues, preferably having from about 8 to about 12 carbon atoms. The acid or ester residue that comprises the acid moiety of the polyester preferably includes residues of phthalic acid; terephthalic acid, naphthalenedicarboxylic acid, isophthalic acid; cyclohexanediacetic acid; diphenyl 4,4'-dicarboxylic acid; succinic acid; glutaric acid; adipic acid; fumaric acid; azelaic acid; resorcinoldicetic acid; didiolic acid; 4,4'-oxybis(benzoic) acid; biphenyldicarboxylic acid; 1,12-dodecanedicarboxylic acid; 4,4'-sulfonyldibenzoic acid; 4,4'-methyldibenzoic acid; trans 4,4'-stilbenedicarboxylic acid; 1,2-, 1,3-, and 1,4-cyclohexanedicarboxylic acids; or a mixture thereof. The polyester may be prepared from one or more of the above dicarboxylic acids.

Preferred examples of dicarboxylic acids or derivatives used to prepare the polyester are terephthalic acid or ester and 2,6-napthalenedicarboxylic acid or ester, succinic, isophthalic, glutaric, adipic acid or ester. Other naphthalene-dicarboxylic acids or their esters may also be used. These include the 1,2-; 1,3-; 1,4-; 1,5-; 1,6-; 1,7-; 1,8-; 2,3-; 2,4-; 2,5-; 2,6-; 2,7-; and 2,8-naphthalenedicarboxylic acids, or a mixture thereof. Even more preferred is 2,6-napthalenedicarboxylic acid as the modifying acid.

The diol component of the polyester comprises residues of diols preferably selected from cycloaliphatic diols preferably having from about 6 to about 20 carbon atoms or aliphatic diols preferably having from about 2 to about 20 carbon atoms. Examples of such diols include ethylene diol, diethylene diol, triethylene diol, neopentyl diol, 1,4 butanediol, 1,6-hexanediol 1,4-cyclohexanedimethanol, 1,3-propanediol, 1,10-decanediol, 2,2,4,4,tetramethyl-1,3-cyclobutanediol, 3-methyl-2,4-pentanediol, 2-methyl-1,4-pentanediol, 2,2,4-trimethyl-1,3-pentanediol, 2-ethyl-1-1,3-hexanediol, 2,2-diethyl-1,3-propanediol, 1,3-hexanediol, 1,4-bis-(hydroxyethoxy)benzene, 2,2-bis-(4-hydroxycyclohexyl)-propane, 2,4-dihydroxy-1,1,3,3-tetramethylcyclobutaine, 2,2-bis-(3-hydroxyethoxyphenyl) propane, 2,2-bis-(4-hydroxypropoxyphenyl)propane, or a mixture thereof The diol component is more preferably selected from ethylene diol, 1,4-butanediol, neopentyl diol, cyclohexanedimethanol, diethylene diol, or a mixture thereof. The diols may be modified with up to about about 50 mol % and more preferably up to about 20 mol % of any of the other diols disclosed herein.

It is preferred that the polyesters of the invention are essentially linear. The polyesters may be modified with low levels of one or more branching agents. A branching agent is herein defined as a molecule that has at least three functional groups that can participate in a polyester forming reaction, such as hydroxyl, carboxylic acid, carboxylic ester, phosphorous-based ester (potentially trifunctional) and anhydride (difunctional).

Branching agents useful in preparing the polyester of the invention include, but are not limited to glycerol, pentaerythritol, trimellitic anhydride, pyromellitic dianhydride, tartaric acid, or a mixture thereof. If branching agents are used in the condensation polymerization reaction, a preferred range for the branching agent is from about 0.1 to about 2.0 weight %, more preferably from about 0.2 to about 1.0 weight %, based on the total weight of the polyester.

Addition of branching agents at low levels does not have a significant detrimental effect on the physical properties of the polyester and provides additional melt strength which can be very useful in film extruding operations. High levels of branching agents incorporated in the copolyesters result in copolyesters with poor physical properties, for example, low elongation.

An agent comprising one or more ion-containing monomers may be added to increase the melt viscosity of the polyesters. The ion-containing monomers useful in the invention, include, but are not limited to, alkaline earth metal salts of sulfisophthalic acid or a derivative thereof. The preferred weight percentage for ion-containing monomers is from about 0.3 to about 5.0 mole %, preferably from about 0.3 to about 3.0 mole %. The ion containing monomers also increase the melt viscosity of the polyesters and do not reduce the elongation of the films to substantially low levels.

The homo or copolyesters of the invention are preferably prepared in a reaction carried out using diols and diacids (or diesters or anhydrides) at temperatures from about 150° C. to about 300° C. in the presence of polycondensation catalysts, including, but not limited to, titanium tetrachloride, titanium tetraisopropoxide, manganese diacetate, antimony oxide, antimony triacetate, dibutyl tin diacetate, zinc chloride, or a mixture thereof. The catalysts are typically employed in amounts between about 10 to about 1000 ppm, based on the total weight of the reactants. The final stage of the reaction is generally conducted under high vacuum (about<10 mm of Hg) in order to produce a high molecular weight polyester.

The invention also relates to the modification, as discussed herein, of high molecular weight homo or copolyesters prepared by a method comprising the following steps:

(I) combining the diols and diacids as described herein, with a catalyst system, wherein the catalyst system comprises Mn, Sb, Ti and other similar metallic species;

(II) in a first stage, heating said reaction mixture at from about 190° C. and about 220° C., at or slightly above atmospheric pressure, and (III) in a second stage adding a phosphorous based additive, heating the reaction mixture between about 220° C. and about 290° C. under a reduced pressure of about 0.05 to about 2.00 mm of Hg.

The polymers of the present invention, e.g., polyesters, are preferably prepared with one of the above named catalyst systems in the presence of a phosphorous based additive. The preferred concentration of catalyst in the reaction is about 5 to about 220 ppm, with the most preferred concentration being about 20 to about 200 ppm. This reaction is best carried out in the two stages as described above.

In another embodiment of the invention, a polycarbonate may be modified by introduction of the silicone polymer emulsion into the reaction medium. The polycarbonates that may be modified, include, but are not limited to, homopolymers, copolymers, or a mixture thereof that are prepared by reacting a dihydric phenol with a carbonate precursor. The dihydric phenols which may be used to produce the carbonate, include, but are not limited to bisphenol-A, (2,2-bis(4-hydroxyphenyl)propane), bis(4-hydroxyphenyl)methane, 2,2-bis(4-hydroxy-3-methylphenyl)propane, 4,4-bis(4-hydroxyphenyl heptane), 2,2-(3,5,3',5'-tetrachloro-4,4'-dihydroxydiphenyl)propane, 2,2(3,5,3',5'-tetrabromo-4,4'-dihydroxydiphenyl)propane, (3,3'-dichloro-4,4'-dihydroxydiphenyl) methane, or a mixture thereof. Branching agents useful in preparing the polycarbonate of the invention include, but are not limited to glycerol, pentaerythritol, trimellitic anhydride, pyromellitic dianhydride, tartaric acid, or a mixture thereof. If branching agents are used in the condensation polymerization reaction, a preferred range for the branching agent is from about 0.1 to about 2.0 weight %, more preferably from about 0.2 to about 1.0 weight %, based on the total weight of the polyester.

In another embodiment of the invention, the thermoplastic condensation polymer to be modified by introduction of the silicone polymer emulsion may comprise a polyurethane. The polyurethane that may be modified comprises residues of a diol or diols and residues of a di-isocyanante or di-isocyanates. The diol residues of the polyurethane may be derived from diols including but not limited to, 1,3-cyclobutanediol, 1,3-cyclopentanediol, 1,2-cyclohexanediol, 1,3-cyclohexanediol, 1,4-cyclohexanediol, 2-cyclohexane-1,4-diol, 2-methyl-1,4-cyclohexanediol, 2-ethyl- 1,4 cyclohexanediol, 1,3-cycloheptanediol, 1,4 cycloheptanediol, 2-methyl-1,4 cycloheptanediol, 4-methyl-1,3-cycloheptanediol, 1,3-cyclooctanediol, 1,4 cyclooctanediol, 1,5 cyclooctanediol, 5-methyl1,4-cyclooctanediol, 5-ethyl-1,4-cyclooctanediol, 5-propyl-1,4 cyclooctanediol, 5-butyl, 1,4-cyclooctanediol, 5-hexyl- 1,4-cyclooctanediol, 5-heptyl- 1,4-cyclooctanediol, 5-octyl-1,4 cyclooctanediol, 4,4' methylenebis(cyclohexanol), 4,4'-methylenebis(2-methylcyclohexanol), 3,3'-methylenebis(cyclohexanol), 4,4' ethylenebis(cyclohexanol), 4,4'propylenebis(cyclohexanol), 4,4' butylenebis(cyclohexanol), 4,4' isopropylidenebis(cyclohexanol), 4,4' isobutylenebis(cyclohexanol), 4,4' dihydroxydicyclohexyl, 4,4' carbonylbis(cyclohexanol), 3,3'-carbonylbis(cyclohexanol), 4,4'sulfonylbis(cyclohexanol), 4,4'-oxybis(cyclohexanol), or a mixture thereof.

The polyurethanes of the invention can be prepared using any known methods for bringing together, in the presence or absence of solvents, polyisocyanates, extenders, and optionally, high molecular weight polyols. This includes manual or mechanical mixing means including casting, reaction extrusion, reaction injection molding and related processes. Typical preparative methods useful in the instant invention are disclosed in U.S. Pat. Nos. 4,376,834 and 4,567,236, incorporated herein in their entireties by this reference, which disclosures relate to polyurethane plastic forming ingredients and preparative procedures.

The mixing of the reactants may be carried out at ambient temperature, i.e, at a temperature from about 20° C. to about 25° C. The resulting mixture is preferably heated to a temperature from about 40° C. to about 130° C., more preferably from about 50° C. to about 100° C.; preferably one or more of the reactants is heated to a temperature within these ranges before admixing.

A catalyst may optionally be included in the reaction mixture that is used to prepare the polyurethanes. Any of the catalysts conventionally employed in the art to catalyze the reaction of an isocyanate with a reactive hydrogen containing compound may be used for this purpose. Suitable catalysts are disclosed in U.S. Pat. No. 4,202,957 at column 5, lines 45 to 67, incorporated herein in its entirety by this reference. The amount of catalyst used is preferably within the range of about 0.02 to about 2.0% by weight, based on the total weight of the reactants. In a particular embodiment of the one-shot procedure, the reaction is carried out on a continuous basis using apparatus and procedures such as that disclosed in U.S. Pat. No. 3,642,964, incorporated herein in its entirety by this reference.

The polyurethanes of this invention include both thermoplastic injection-moldable and thermoset resins. The thermoplastic resins are obtained by employing substantially difunctional polyisocyanates and difunctional extenders, and a polyol having a functionality preferably not exceeding about 4, although polyols having higher functionalities may be employed where the weight proportion used in a low range. As will be recognized by one skilled in the art, this limit will vary according to the nature of the polyol, the molecular weight of the polyol, and the amount of polyol used. In general, the higher the molecular weight of the polyol, the higher the functionality which can be employed without losing the thermoplastic properties in the polyurethane product.

The di-isocyanante residue may be derived from di-isocyanates, including, but not limited to methylenebis (phenyl isocyanate) including the 4,4'-isomer, the 2,4' isomer or a mixture thereof, m-and p-phenylene diisocyanates, chlorophenylene diisocyanates, α, β-xylylene diisocyanate, 2,4-and 2,6-toluene diisocyanates and mixtures of these latter two isomers, tolidine diisocyanate, hexamethylene diisocyanate, 1,5-naphthalene diisocyante, isophorone diisocyanate and the like, cycloaliphatic diisocyanates, such as methylenebis(cyclohexyl isocyanate) including the 4,4' isomer, the 2,4' isomer or a mixture thereof, and all the geometric isomers thereof including trans/trans, cis/trans, cis/cis or a mixture thereof, cyclohexylene diisocyanantes (1,2, 1,3 or 1,4-), 1-methyl-2,5-cyclohexylene diisocyanate, 1-methyl-2,4-cyclohexylene diisocyante, 1-methyl-2,6-cyclohexyl diisocyanate, 4,4'-isopropylidenebis(cyclohexyl isocyanate), 4,4'-diisocyanatodicyclohexyl and all geometric isomers, or a mixture thereof. Also included are the modified forms of methylenebis(phenylisocyanate). By the latter are meant those forms of methylenebis(phenyl isocyanate) which have been treated to render them stable liquids at ambient temperature. Such products include those which have been reacted with a minor amount (up to about 0.2 equivalents per equivalent of polyisocyanate) of an aliphatic diol or a mixture of aliphatic diols such as the modified methylenebis(phenyl isocyanates) described in U.S. Pat. Nos. 3,394,164; 3,644,457; 3,883,571; 4,031,026; 4,115,429; 4,118,411; and 4,299,347.

The modified methylenebis(phenyl isocyanates) also include those which have been treated so as to convert a minor proportion of the diisocyanate to the corresponding carbodiimide which then interacts with further diisocyanate to form the aeration-imine groups, the resulting product being a stable liquid at ambient temperatures as described, for example in U.S. Pat. No. 3,384,653. Mixtures of any of the above-named polyisocyanates can be employed if desired. Further in the case of the preparation of those polyurethanes of the invention which are thermoset, it is possible to introduce into the polyisocyanate component employed in the reaction minor amounts (up to about 30 percent by weight) of polymethylene polyphenyl polyisocyanates. The latter are mixtures containing from about 20 to about 90 percent by weight of methylenebis(phenyl isocyanate) the remainder of the mixture being polymethylene polyphenyl polyisocyanates of functionality higher than about 2.0. Such polyisocyanates and methods for their preparation are well known in the art; see for example, U.S. Pat. Nos. 2,683,730; 2,950,263; 3,012,008 and 3,097,191. Branching agents useful in preparing the polyurethane of the invention include, but are not limited to glycerol, pentaerythritol, trimellitic anhydride, pyromellitic dianhydride, tartaric acid, or a mixture thereof. If branching agents are used in the condensation polymerization reaction, a preferred range for the branching agent is from about 0.1 to about 2.0 weight %, more preferably from about 0.2 to 1.0 about weight %, based on the total weight of the polymer.

The polymers of the invention may be buffered. Buffers can be utilized to control the formation of diethylene glycol, among other uses. Preferred buffers include, sodium acetate, potassium acetate, lithium acetate, sodium phosphate monobasic, potassium phosphate dibasic and sodium carbonate. Buffering agents are useful to limit the amount of acidic species which, in turn, causes dehydration of the diols to give ether diol. Accordingly, it can be desirable to limit such acid species through the use of buffering agents.

Other ingredients may optionally be added to the compositions of the present invention to enhance the performance properties of the condensation polymer/silicone polymer blend. For example, reinforcing agents, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, mixtures thereof, and the like, can be included herein. All of these additives and the uses thereof are well known in the art. Any of these compounds can be used so long as they do not hinder the present invention from accomplishing its objects.

In a particularly preferred embodiment relating to the addition of reinforcing agents to the compositions of the present invention, glass fibers may be added to the condensation polymer compositions to provide particular advantages to the resulting compositions. Glass fibers that are preferred in the present invention conventionally have an average standard diameter of greater than about 5 microns, with a range of from about 1 to about 20 microns. The length of the glass filaments whether or not they are bundled into fibers, and whether the fibers are further bundled into yarns, ropes or rovings, and the like, are not critical to this invention. However, for the purpose of preparing the present compositions, it is preferable to use filamentous glass in the form of chopped strands of from about 1.5 mm to about 10 mm long, and, preferably, less than about 6 mm long. In the pellets and molded articles of the compositions, even shorter lengths will be encountered, because during compounding, considerable fragmentation occurs. This is, however, desirable because the best properties are exhibited for injection molded articles where the filament lengths are between about 0.03 mm and about 1 mm. Especially preferred are glass fibers having an average standard diameter in the range of greater than about 5 microns, preferably about 5 microns to about 14 microns, and the average filament length dispersed in the molded articles being between about 0.15 and about 0.4 mm. Consequently, glass filaments are dispersed uniformly and the molded articles exhibit uniform and balanced mechanical properties, especially surface smoothness.

The amount of the glass fibers can vary broadly from about 10 to about 50% by weight, and most preferably about 10 to about 40% by weight, based on the total polymer composition. These glass fibers are typically conventionally sized with coupling agents, such as aminosilanes and epoxysilanes and titanates, and adhesion promoters such as epoxies, urethanes, cellulosics, starch, cyanurates, and the like.

In one embodiment, when the glass fiber is present in the polymer molding composition, the polymer is preferably from about 70 to about 85% by weight of the total composition based on the total weight percentages of the silicone polymers and the condensation polymers, wherein the percentage equals about 100%. Preferably, the polymer in the polymer molding composition comprises polyester.

Examples of other reinforcing agents that are useful in addition to glass fibers, include, but are not limited to, carbon fibers, mica, clay, talc, wollastonite, calcium carbonate, or a combination thereof. The polymer compositions of the invention may be reinforced with a mixture of glass and other reinforcing agents as described above, such as mica or talc, and/or with other additives.

In accordance with the invention herein, the silicone polymer emulsion and glass fibers, as well as other reinforcing agents, may be introduced into the condensation polymerization at various stages of the process. In a particularly preferred embodiment of the invention herein, the glass fibers are added directly to the condensation polymerization reaction. Since the glass fibers can be sufficiently blended during this stage, there is no need for a post-blending step, such as extrusion, to incorporate the glass fibers into the compositions. This is particularly advantageous to the present invention because a post-blending step is energy intensive, expensive and may often cause a reduction in the molecular weight of the condensation polymer.

In a further embodiment, the silicone polymer emulsion may preferably be introduced into the condensation polymerization at various stages of a glycolysis reaction. In such a process, a polyester, copolyester, polyesteramide or polycarbonate can be reduced in molecular weight by the additional of a glycol. This reaction takes place very rapidly at temperatures of from about 200° C. to about 300° C., preferably at temperatures of about 240° C. to about 280° C.

The final blend can be affected by the time the silicone polymer is added to the glycolyzed polymer. For example, in the glycolysis of poly(ethylene terephthalate) (PET) ,the silicone polymer emulsion can be added after very little molecular weight reduction (from for example 0.7 Ih.V. to 0.6 Ih.V.), e.g., early in the glycolysis reaction, or after significant molecular weight reduction (from for example 0.7 Ih.V. to 0.05 Ih.V.), e.g., later in the glycolysis reaction. The final blend can be affected by the time the silicone polymer emulsion is added to the glycolyzed polymer. While not wishing to be bound by any mechanism, it is believed that the size and shape of the emulsion polymer in the condensation polymer blend can be affected by the time of the addition. Also, particular chemical interaction between emulsion polymers and condensation polymers are affected by time of addition, and they, in consequence, will affect the final blend properties. Such use of glycolyzed polymers is preferred in some circumstances. An example of one such circumstance is that the use of glycolyzed polymers in the invention herein allows a novel use for polymer material that would otherwise end up in a waste stream.

In a preferred embodiment, the diols that may be utilized in the glycolysis reaction include, but are not limited to, any aliphatic or cycloaliphatic diol having from about 2 to about 10 carbon atoms, or a mixture thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans- 2,2,4,4-tetramethyl-1,3-cyclobutanediol, diethylene diol, 2,2,4-trimethyl-1,3-pentanediol, 2-methyl-1,3-propanediol, 2-methyl-1,3-pentanediol, or mixtures thereof. More preferred diols include ethylene diol, propylene diol, tripropylene diol, 1,4-butanediol, diethylene diol, neopentyl diol, cis and trans-cyclohexanedimethanol or a mixture thereof; even more preferred diols include neopentyl diol, ethylene diol, cis or trans cyclohexanedimethanol, 1,4-butanediol, or a mixture thereof.

In relation to that aspect of the invention pertaining to glycolyzed polymers, the amount of diol in the continuous phase may comprise from about 25 to about 100% by weight of the continuous phase, from about 50 to about 100% by weight of the continuous phase, from about 75 to about 100% by weight of the continuous phase, or from about 90 to about 100% by weight of the continuous phase.

In another embodiment of the invention, a modified condensation polymer, including, but not limited to, a thermoplastic elastomer, is produced from a polymer colloid system comprising a first polymer which is a silicone polymer. In this embodiment, the both the silicone polymer and the condensation polymer have Tg's of less than about 40° C. Preferably, the condensation polymer has a Tg of less than 0° C. and essentially no crystallinity, even more preferably, the condensation polymer will have a Tg of less than −20° C. and will have essentially no crystallinity.

End-use applications for the compositions of the condensation polymers produced according to the instant invention include impact-modified polymers, elastomers, high barrier films and coatings, improved barrier polymers, and polymers having improved mechanical properties, such as improved tensile strength, improved elongation at break, better weathering properties, and improved flexural strength. Other end-use applications include engineering resins, coatings, containers for barrier applications and molding plastics. In addition, powder coatings may be produced from the modified condensation polymers produced according to the invention. The polymers produced by this invention are useful for thermoplastic engineering resins, elastomers, films, sheets and container plastics.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

EXAMPLE 1

Preparation of Silicone polymer emulsion in Water/EG solution

To a 65% solids crosslinked polydimethysiloxane emulsion (Dow Corning Lot 13738-84) was added 1.5 phr of Hitenol HS-20 anionic surfactant (DKS International). Ethylene glycol was added to the emulsion to dilute the silicone polymer emulsion to 35% solids. The final silicone polymer emulsion contained 35 wt. % PDMS, 46 wt. % ethylene glycol and 19 wt. % water.

EXAMPLE 2

Incorporation of Crosslinked PDMS into a PET

The blend was prepared by the following procedure. Dimethyl terephthalate (0.5 moles, 97.0 grams), ethylene diol (1.0 moles, 62.0 grams), 16.6 grams of the emulsion of Example 1, and catalyst metals were placed in a 0.5L polymerization reactor under a 1 atmosphere nitrogen atmosphere. The mixture was heated with stirring under a slow nitrogen purge at 200° C. for 1 hour and then 2 hours at 210° C. The temperature was increased to 280° C., the nitrogen flow was stopped and vacuum applied. The polymer was stirred under vacuum (0.1–0.3 Torr) for 60 minutes and then stirring was stopped and heat removed.

EXAMPLE 3

A 65% solids crosslinked polydimethysiloxane emulsion (Dow Corning Lot 13738-84) was was diluted to 50% solids with distilled water. To this was added 1.5 phr of FES 77 surfactant (Henkle Corp). Ethylene glycol was added to the emulsion to dilute the silicone polymer emulsion to 35% solids. The final silicone polymer emulsion contained 35 wt. % PDMS, 36.5 wt. % ethylene glycol and 28.5 wt. % water.

EXAMPLE 4

The blend was prepared by the following procedure. Dimethyl terephthalate (0.5 moles, 97.0 grams), ethylene glycol (1.0 mole, 62.0 grams), 14.3 grams silicone polymer emulsion from Example 3 (30% solids) and catalyst metals were placed in a 0.5L polymerization reactor under a 1 atmosphere nitrogen atmosphere. The mixture was heated with stirring under a slow nitrogen purge at 200° C. for 1 hour and then 210° C. for two hours. The temperature was increased to 280° C. and then nitrogen was shut off and vacuum applied. After 10 minutes of vacuum (0.35 Torr achieved), the vacuum was removed, nitrogen was bled in to increase the pressure to atmospheric pressure and 56.6 grams of the silicone polymer emulsion from Example 2 was added with a 125 mL pressure-equalizing frumel over a 10 minute period. Again, nitrogen flow was shut off and a vacuum applied. Pressure of 0.3–0.5 Torr was maintained for 1 hour as the viscous melt was stirred. Heat was removed and the polymer was allowed to cool and then ground. A tough opaque white film was melt-pressed at 240° C. for 15 seconds. The Ih.V. was 1.1 dL/g, the Tg was−25° C. (2nd cycle), the Tm was 248.2° C. (2nd cycle). TEM showed that the rubber particles were 0.4 microns in size in the polyester blend.

The invention has been described in detail with particular reference to preferred embodiments thereof, but it will be understood that variations and modifications can be effected without departing from the scope and spirit of the invention.

What is claimed is:

1. A method of making a condensation polymer/silicone polymer blend comprising the steps of:
   a. preparing a silicone polymer emulsion comprising
      i) a silicone polymer;
      ii) a surfactant; and
      iii) a liquid continuous phase comprising a diol, wherein the diol comprises from about 25 to about 100% by weight of the continuous phase;

b. introducing the silicone polymer emulsion into a condensation polymerization reaction medium prior to or during the condensation polymerization reaction, wherein the condensation polymerization reaction medium comprises (1) a diacid, di-isocyanate, dialkyl carbonate, diaryl carbonate, dihalo carbonate or a mixture thereof, wherein the condensation polymerization reaction medium may comprise a diol component; and c. polymerizing the diol and component b(1) thereby forming a condensation polymer/silicone polymer blend.

2. The method of claim 1, wherein the continuous phase comprises from about 30 to about 100% by weight diol.

3. The method of claim 1, wherein the continuous phase comprises water.

4. The method of claim 1, wherein the continuous phase comprises from about 1 to about 75% by weight water.

5. The method of claim 1, wherein the diol comprises ethylene diol, 1,3-trimethylene diol, 1,3-propylene diol, tripropylene diol, 1,4-butanediol, 1,5-pentanediol, 1,6-hexanediol, 1,7-heptanediol, 1,8-octanediol, 1,9-nonanediol, neopentyl diol, cis or trans cyclohexanedimethanol, cis or trans 2,2,4,4-tetramethyl-1,3 cyclobutanediol, diethylene diol, or a mixture thereof.

6. The method of claim 1, wherein the silicone polymer comprises homo or copolymers of polydimethylsiloxane, wherein the copolymers comprise aminopropyl, vinyl, mercaptopropyl, phenylmethyl, epoxy or aminoethylaminopropyl functionalities.

7. The method of claim 1, wherein the surfactant comprises alkali metal or ammonium salts of alkyl, aryl or alkylaryl sulfonates, sulfates, phosphates, alkyl and alkylaryl polydiol ethers, ethoxylation products of lauryl, oleyl and stearyl alcohols, alkyl phenol glycol ethers, ethoxylation products of octyl or nonylphenol, or a mixture thereof.

8. The method of claim 1, wherein the silicone polymer is crosslinked prior to addition to the condensation polymer reaction.

9. The method of claim 1, wherein the silicone polymer comprises a functional group, and wherein the functional group comprises an epoxy, acid, hydroxyl, amine, amide, carbonate, or a mixture thereof.

10. The method of claim 1, wherein glass fibers are added to the condensation polymerization reaction medium prior to or during the condensation polymerization reaction.

* * * * *